United States Patent [19]
Kondo et al.

[11] Patent Number: 5,991,244
[45] Date of Patent: Nov. 23, 1999

[54] CONTROL SYSTEM FOR SELECTIVELY DISPLAYING ITEMS RECORDED ON A RECORDING MEDIUM

[75] Inventors: Toshiyasu Kondo, Tokyo-to; Shigeru Watanabe, Tokorozawa; Wataru Negishi; Kenichi Kita, both of Tokyo-to, all of Japan

[73] Assignee: Pioneer Electronic Corporation, Tokyo-to, Japan

[21] Appl. No.: 09/100,098

[22] Filed: Jun. 19, 1998

[30] Foreign Application Priority Data

Jun. 20, 1997 [JP] Japan ................................ 9-164448

[51] Int. Cl.⁶ .......................... G11B 17/22; H04N 5/91
[52] U.S. Cl. ........................................... 369/33; 386/95
[58] Field of Search ................................ 369/33, 32, 30, 369/47, 48; 386/126, 125, 95

[56] References Cited

U.S. PATENT DOCUMENTS 5,228,015  7/1993  Arbiter et al. ........................ 369/33
5,253,234  10/1993 Ogawa et al. ........................ 369/33
5,771,334  6/1998  Yamauchi et al. ..................... 386/95

Primary Examiner—Tan Dinh
Attorney, Agent, or Firm—Morgan, Lewis & Bockius LLP

[57] ABSTRACT

An information reproducing system for selecting a reproduction item and reproducing an information unit corresponding to the selected reproduction item is provided. The system includes a recording medium, a displaying apparatus, a selecting apparatus, and a reproducing apparatus. The reproduction items are displayed in a menu on the displaying apparatus. The selecting apparatus outputs instruction signals for selecting one of the reproduction items displayed in the menu. The reproducing apparatus reads out the information unit corresponding to the selected reproduction item from the recording medium and reproduces it. The selecting apparatus and the reproducing apparatus are disposed in separate casings and are connected to each other with a wire. The selecting apparatus has a small number of switches. The reproducing apparatus has a controller having several universal terminals. Each switch of the selecting apparatus is connected with a respective universal terminal through a single line. Each instruction signal is directly sent from the selecting apparatus to the controller of the reproducing apparatus through the single line.

8 Claims, 9 Drawing Sheets

CONTROL SYSTEM FOR SELECTIVELY DISPLAYING ITEMS RECORDED ON A RECORDING MEDIUM

BACKGROUND OF THE INVENTION

1. Field of the Invention

The present invention relates generally to an information reproducing system for reproducing information, such as images and the like, recorded on a DVD, which has a much greater memory capacity than a CD (Compact Disk), and more specifically to an information reproducing system to be mainly used for display of information.

2. Description of the Related Art

An LDP (Laser Disk Player) used for reproducing an LD (Laser Disk) is universally popular. The LD is an optical disc to record reproduction information, such as images, pictures and the like, thereon.

In order to indicate specific positions in reproduction information recorded on the LD, chapter numbers or frame numbers are also recorded on the LD together with picture signals. The LDP performs information retrieval, i.e., the so called chapter search or frame search, based on these numbers. Thus, the LDP can reproduce specific information units (chapters or frames) in accordance with an instruction by the user.

Generally, such an LDP is used for reproducing movies, concerts and so on. However, as the LDP can reproduce images and pictures with sounds, the LDP can be used for display of information in a museum for example. In case that the LDP is used for display of information in a museum, a switch box having selection switches to allow visitors of the museum to select desired information, and a controller for controlling reproduction of the information selected by the switch box are needed in addition to the LDP. Furthermore, the controller has to include a table information to correlate the selection switches of the switch box and the chapter numbers or the frame numbers of the information units. For example, it is assumed that images with respect to seasons, i.e., spring, summer, autumn and winter, are displayed by a combination of the LDP, the switch box and the controller in a museum. In this case, if the visitor depresses one of the selection switches of the switch box to select the desired one season, then the controller obtains the chapter number or the frame number of the information units corresponding to selection switch depressed by the visitor by using the table information, and sends the obtained chapter number or the frame number to the LDP. Then, the LDP reproduces the information units corresponding to the chapter number of the frame number sent from the controller.

Thus, the LDP which is being marketed can be applied for display of information in a museum or the like without modification.

However, as mentioned above, if the LDP is applied for display of information in a museum or the like, it is necessary to add a dedicated controller and further produce table information to correlate selection switches of a switch box and the chapter numbers or the frame numbers of information units. Especially, if contents of display are changed, the reproduction information for the display also changed. Therefore, table information has to be produced each time contents of display are changed. Thus, in view of both software and hardware, structure of the dedicated controller becomes complex and production costs of the dedicated controller becomes high. Consequently, overall, the above mentioned combination of the LDP, the switch box and the dedicated controller is complex in structure, and expensive. Furthermore, in order to set up this system in a museum, a relatively large installation space is needed. This results a lack of usability.

SUMMARY OF THE INVENTION

It is therefore an object of the present invention to provide an information reproducing system which can appropriately be used for display of information in a museum or the like, simplify its structure, reduce a production cost, and improve its usability.

According to the present invention, the above mentioned object can be achieved by an information reproducing system for selecting one of a plurality of reproduction items, fetching at least one information unit corresponding to the selected one of the plurality of reproduction items from among a plurality of information units, and reproducing the fetched at least one information unit, the information reproducing system having: (A) a record medium on which the plurality of information units with respect to all of the plurality of reproduction items, reproduction control command information for fetching at least one information unit corresponding to one of the plurality of reproduction items, and menu information for forming a menu in which the plurality of reproduction items are arranged respectively are recorded; (B) a displaying apparatus connected with a reproducing apparatus for displaying the menu; (C) a selecting apparatus connected with the reproducing apparatus for selecting one of the plurality of reproduction items, and outputting an instruction signal indicating the selected one of the plurality of reproduction items to the reproducing apparatus; and (D) the reproducing apparatus having: a menu displaying device for reading the menu information from the record medium, forming the menu by using the read menu information, and displaying the formed menu onto the displaying apparatus; a receiving device for receiving the instruction signal; a control device for reading the reproduction control command in formation from the record medium, and fetching at least one information unit corresponding to the selected one of the plurality of reproduction items indicated by the received instruction signal from among the plurality of information units recorded on the record medium on the basis of the read reproduction control command information; and a reproducing device for reproducing the fetched at least one information unit.

The system can be appropriately used for display of information in a museum or the like. The system selects one of a plurality of reproduction items, fetches at least one of a plurality of information units corresponding to the selected reproduction item, and reproduces the fetched information unit. For example, an reproduction item is a display item in a museum, and an information unit is a content of the display. More concretely, an information unit is, for example, an image, a sound, a set of images, a set of sounds, a set of both images and sounds, a music, a picture, a movie or so on. There is a case that one information unit corresponds to one information item. Further, there is a case that a combination of a plurality of information units corresponds to one information item.

A plurality of information units are recorded on the record medium. Furthermore, reproduction control command information and menu information are also recorded on the record medium. The reproduction control command information is information for fetching at least one information unit corresponding to one of the reproduction items. The menu information is information for forming a menu.

The reproducing apparatus reads menu information from the record medium, forms a menu by using the menu information, and displays the menu onto the display apparatus. In the menu, the reproduction items are arranged respectively. By seeing the menu, the user or the visitor can be easily select one of the reproduction items.

The selecting apparatus selects one of the reproduction items in accordance with an input operation by the user or the visitor, and outputs an instruction signal indicating the selected reproduction item to the reproducing apparatus.

The reproducing apparatus receives the instruction signal. Therefore, the reproducing apparatus recognizes the selected reproduction item. Then, the reproducing apparatus reads the reproduction control command information from the record medium, and fetches, from the record medium, at least one information unit corresponding to the selected reproduction item on the basis of the read reproduction control command information. Then, the reproducing apparatus reproduces the fetched information unit. In addition, in case that a combination of a plurality of information units corresponds to the selected reproduction item, the reproducing apparatus fetches the plurality of information units on the basis of the read reproduction control command information, and reproduces the fetched plurality of information units.

Thus, since reproduction control command information is recorded on the record medium, the reproducing apparatus can reproduce one or more information units corresponding to the selected reproduction item on the basis of the reproduction control command information. Namely, the reproducing apparatus can recognize a relationship between the information units and the reproduction item on the basis of the reproduction control command information recorded on the record medium. If contents of display in a museum are changed, one or more information units, an reproduction item, and a relationship between the information units and the reproduction item have to be changed. However, at this time, it is enough to change only the record medium. Therefore, reproduction for display in a museum can be performed by the simple system having only the reproducing apparatus, the selecting apparatus, the displaying apparatus and the record medium. That is, it is unnecessary to add the aforementioned dedicated controller having the table information to the system. Thus, it is possible to simplify the structure of the system, reduce production cost, reduce the installation space, and improve usability. Furthermore, since a relationship between one or more information units and an reproduction item is recorded on the record medium as reproduction control command information, it is possible to design the hardware of the system regardless of contents of display.

Moreover, the selecting apparatus and the reproducing apparatus are separated from each other, and the selecting apparatus and the reproducing apparatus may be connected with each other by a wire. Therefore, the selecting apparatus can be placed at various places so as to allow the user or the visitor to manipulate it easily.

Moreover, the reproducing apparatus has a first connector, one end of the wire is connected with a second connector, and the first connector and the second connector are detachably connected with each other. Therefore, it is possible to improve usability of the system.

Alternatively, the selecting apparatus and the reproducing apparatus may be wirelessly connected with each other, for example, by infrared. Therefore, the selecting apparatus can be placed at various places so as to allow the user or the visitor to manipulate it easily.

Furthermore, the selecting apparatus may have a plurality of selection switches for selecting one of the plurality of reproduction items and an enter switch for deciding the selected one of the plurality of reproduction items. Moreover, in this case, the selecting apparatus may output a selection signal to the reproducing apparatus when any one of the plurality of selection switches is depressed and output the instruction signal to the reproducing apparatus when the enter switch is depressed, the receiving device of the reproducing apparatus may receive the selection signal, and the reproducing apparatus may have a mark displaying device for displaying a mark for indicating the selected one of the plurality of reproduction items in the menu on the basis of the received selection signal. Therefore, the user or the visitor can easily select one of the reproduction items by seeing the menu.

Alternatively, the selecting apparatus may have a joystick for selecting one of the plurality of reproduction items and an enter switch for deciding the selected one of the plurality of reproduction items. Furthermore, in this case, the selecting apparatus may output a selection signal to the reproducing apparatus when the joystick is tilted and output the instruction signal to the reproducing apparatus when the enter switch is depressed, the receiving device of the reproducing apparatus may receive the selection signal, and the reproducing apparatus may have a mark displaying device for displaying a mark for indicating the selected one of the plurality of reproduction items in the menu on the basis of the received selection signal. Therefore, the user or the visitor can easily select one of the reproduction items by seeing the menu.

Furthermore, the receiving device of the reproducing apparatus may be an IC chip in which a plurality of universal terminals to which any function can be set are pre-installed, and the plurality of universal terminals are used for receiving the instruction signal. Therefore, it is unnecessary to add the new terminals in order to realize the invention. Consequently, it is possible to simplify the system.

Moreover, in case of the system having the reproducing apparatus and the selecting apparatus connected with the reproducing apparatus by a wire, a wireless control apparatus wirelessly connected with the reproducing apparatus may be added. Like the selecting apparatus, the wireless control apparatus selects one of the plurality of reproduction items, and outputs a wireless instruction signal indicating the selected one of the plurality of reproduction items to the reproducing apparatus. Therefore, the user or the visitor can select either of the selecting apparatus and the wireless control apparatus. Accordingly, it is possible to improve usability of the system.

Moreover, in this case, the wireless control apparatus may have: a third connector for detachably connecting with the second connector; and a converting device for converting the instruction signal received from the selecting apparatus via the second connector and the third connector into the wireless instruction signal. When the user or the visitor operates the selecting apparatus, the selecting apparatus outputs the instruction signal. The instruction signal is applied to the wireless control apparatus via the wire, the second connector and the third connector. Then, the wireless control apparatus converts the instruction signal received from the selecting apparatus into the wireless instruction signal, and outputs the wireless instruction signal to the reproducing apparatus. Thus, it is possible to improve usability of the system.

According to the present invention, the above mentioned object can be also achieved by an information reproducing system for selecting one of a plurality of reproduction items, fetching at least one information unit corresponding to the selected one of the plurality of reproduction items from a record medium, on which the plurality of information units with respect to all of the plurality of reproduction items, reproduction control command information for fetching at least one information unit corresponding to one of the plurality of reproduction items, and menu information for forming a menu in which the plurality of reproduction items are arranged respectively are recorded, and reproducing the fetched at least one information unit, the information reproducing system having: (A) a displaying apparatus connected with a reproducing apparatus for displaying the menu: (B) a selecting apparatus connected with the reproducing apparatus for selecting one of the plurality of reproduction items, and outputting an instruction signal indicating the selected one of the plurality of reproduction items to the reproducing apparatus: and (C) the reproducing apparatus having: a menu displaying device for reading the menu information from the record medium, forming the menu by using the read menu information, and displaying the formed menu onto the displaying apparatus; a receiving device for receiving the instruction signal; a control device for reading the reproduction control command information from the record medium, and fetching at least one information unit corresponding to the selected one of the plurality of reproduction items indicated by the received instruction signal from among the plurality of information units on the basis of the read reproduction control command information; and a reproducing device for reproducing the fetched at least one information unit.

A plurality of information units are recorded on the record medium. Furthermore, reproduction control command information and menu information are also recorded on the record medium. The reproduction control command information is information for fetching at least one information unit that corresponds to one of the reproduction items. The menu information is information for forming a menu.

The reproducing apparatus reads the menu information from the record medium, forms the menu by using the menu information, and displays the menu onto the display apparatus. In the menu, the reproduction items are arranged respectively. By seeing the menu, the user or the visitor can easily select one of the reproduction items.

The selecting apparatus selects one of the reproduction items in accordance with an input operation by the user or the visitor, and outputs an instruction signal indicating the selected one of the plurality of reproduction items to the reproducing apparatus.

The reproducing apparatus receives the instruction signal. Therefore, the reproducing apparatus recognizes the selected reproduction item. Then, the reproducing apparatus reads the reproduction control command information from there cord medium, and fetches, from the record medium, at least one information unit that corresponds to the selected reproduction item on the basis of the read reproduction control command information. Then, the reproducing apparatus reproduces the fetched information unit.

Thus, since reproduction control command information is recorded on the record medium, the reproducing apparatus can reproduce one or more information units corresponding to the selected reproduction item on the basis of the reproduction control command information. Namely, the reproducing apparatus can recognize a relationship between the information units and the reproduction item on the basis of the reproduction control command information recorded on the record medium. If contents of display in a museum are changed, one or more information units, an reproduction item, and a relationship between the information units and the reproduction item have to be changed. However, at this time, it is enough to change only the record medium. Therefore, reproduction for display in a museum can be performed by the simple system having only the reproducing apparatus, the selecting apparatus and the displaying apparatus. That is, it is unnecessary to add the aforementioned dedicated controller having the table information to the system. Thus, it is possible to simplify the structure of the system, reduce production cost, and improve usability.

According to the present invention, the above mentioned object can be also achieved by an information reproducing system for selecting one of a plurality of reproduction items, fetching at least one information unit corresponding to the selected one of the plurality of reproduction items from among a plurality of information units, and reproducing the fetched at least one information unit, the information reproducing system having: (A) a record medium on which the plurality of information units with respect to all of the plurality of reproduction items, reproduction control command information for fetching at least one information unit corresponding to one of the plurality of reproduction items, and menu information for forming a menu in which the plurality of reproduction items are arranged respectively, are recorded; (B) a displaying apparatus connected with a reproducing apparatus for displaying the menu; (C) a selecting apparatus connected with the reproducing apparatus for selecting one of the plurality of reproduction items, and outputting a first instruction signal indicating the selected one of the plurality of reproduction items to the reproducing apparatus; (D) a wireless control apparatus wirelessly connected with the reproducing apparatus for selecting one of the plurality of reproduction items, and wirelessly outputting a second instruction signal indicating the selected one of the plurality of reproduction items to the reproducing apparatus; (E) the reproducing apparatus having: a menu displaying device for reading the menu information from the record medium, forming the menu by using the read menu information, and displaying the formed menu onto the displaying apparatus; a receiving device for receiving the first instruction signal and the second instruction signal; a control device for reading the reproduction control command information from the record medium, and fetching at least one information unit corresponding to the selected one of the plurality of reproduction items indicated by either one of the received first instruction signal and the received second instruction signal from among the plurality of information units recorded on the record medium on the basis of the read reproduction control command information; and a reproducing device for reproducing the fetched at least one information unit.

Thus, the selecting apparatus selects one of the reproduction items in accordance with an input operation by the user or the visitor, and outputs the first instruction signal indicating the selected reproduction items. Similarly, the wireless control apparatus also selects one of the reproduction items in accordance with another input operation by the user or the visitor, and outputs the second instruction signal indicating the selected reproduction items. The reproducing apparatus receives the first instruction signal and the second instruction signal, respectively. The function of the first instruction signal is the same as that of the second instruction signal. Therefore, the user or the visitor can select one of the selecting apparatus and the wireless control apparatus in order to select the reproduction items. Consequently, it is possible to improve usability of the information reproducing system.

Furthermore, the reproducing apparatus may have a key input device for inputting an instruction to the reproducing apparatus in order to operate the reproducing apparatus. The key input device may be attached on a body of the reproducing apparatus. The key input device may input an instruction in accordance with an input operation by the user. The key input device may include means to operate the reproducing apparatus, such as, for example, a power supply switch means, a record medium ejection switch means, a reproduction item selection switch means, a reproduction start switch means, a reproduction stop switch means, and so on.

Moreover, in the reproducing apparatus, the receiving device may have: a connector attached on the body of the reproducing apparatus and detachably connected with the selecting apparatus by a wire for receiving the first instruction signal; a wireless input device attached on the body of the reproducing apparatus for wirelessly receiving the second instruction signal; and a control device mounted within the body of the reproducing apparatus and connected with the connector, the wireless input device and the key input device respectively by a bus for controlling the reproducing apparatus in accordance with the first instruction signal from the selecting apparatus, the second instruction signal from the wireless control apparatus and the instruction inputted by the key input device. Thus, the user or the visitor can select one from among the selecting apparatus connected with the connector, the wireless control apparatus wirelessly connected with the wireless input device, and the key input device. The key input device is directly attached on the reproducing apparatus, so that the user can directly control the reproducing apparatus. The selecting apparatus is connected with the reproducing apparatus via the connector and the wire, so that it is possible to place the selecting apparatus at various places distant from the reproducing apparatus. The wireless control apparatus is wirelessly connected with the reproducing apparatus, so that it is possible to variously change a setting position of the wireless control apparatus. Consequently, it is possible to improve usability of the information reproducing system.

The nature, utility, and further feature of this invention will be more clearly apparent from the following detailed description with respect to preferred embodiments of the invention when read in conjunction with the accompanying drawings briefly described below.

DETAILED DESCRIPTION OF THE PREFERRED EMBODIMENTS

Referring to the accompanying drawings, embodiments of the present invention will be now explained. In the description set forth herein, the present invention is embodied in an information reproducing system to be used for display of information in a museum or the like.

(I) Overall Configuration of Information Reproducing System

Figure 1A:
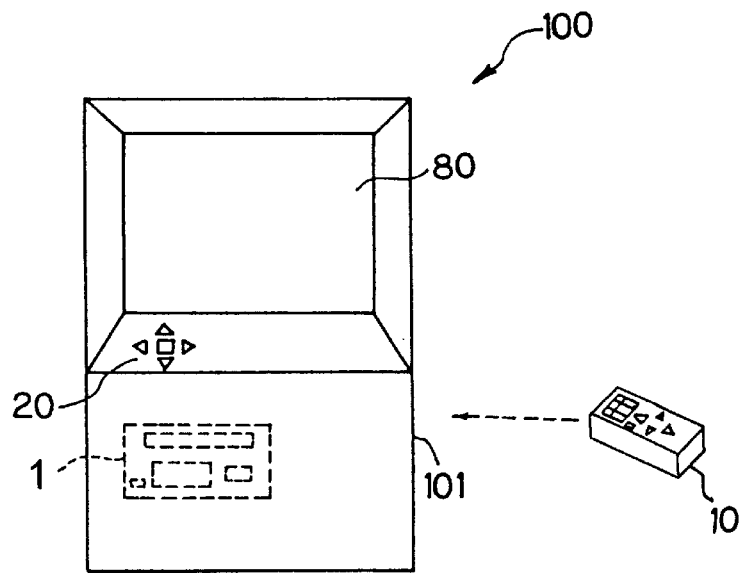
FIG. 1A is a front view of an information reproducing apparatus according to an embodiment of the present invention.
Figure 1B:
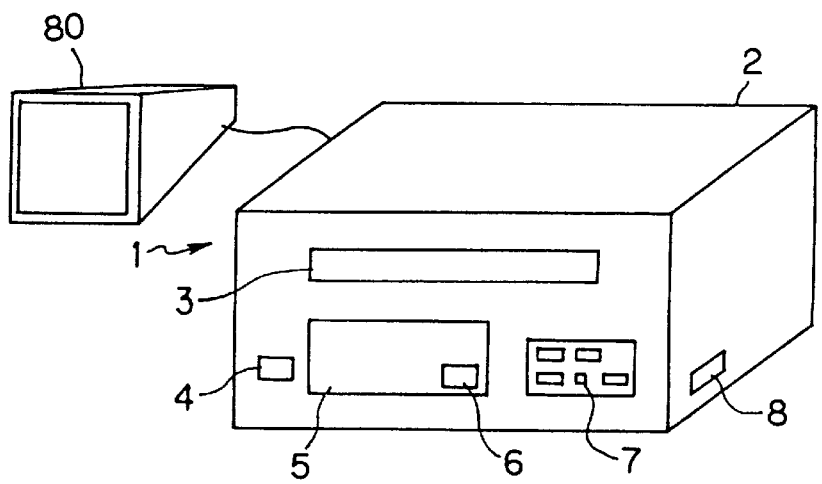
FIG. 1B is a perspective view of a DVD player included in the information reproducing system of the embodiment.
Figure 1C:
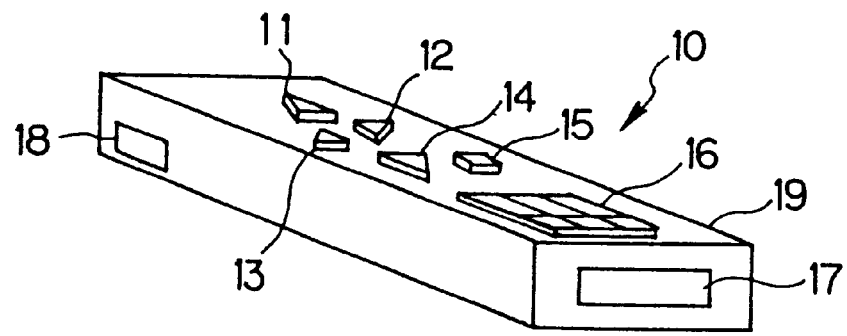
FIG. 1C is a perspective view of a remote controller included in the information reproducing system of the embodiment.
Figure 1D:
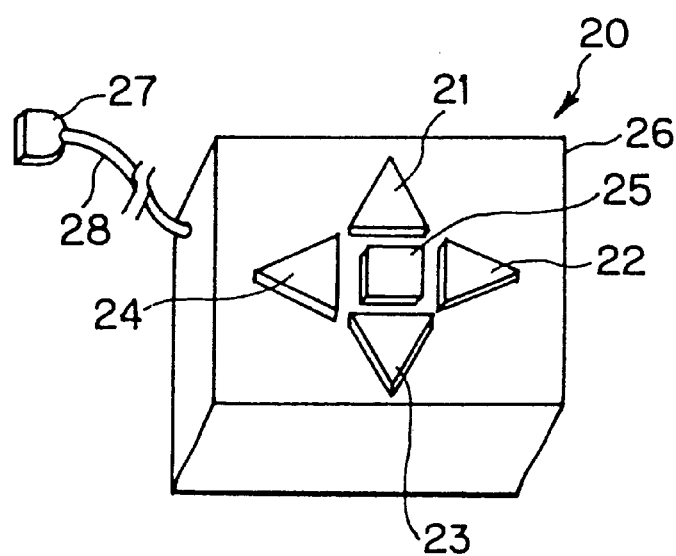
FIG. 1D is a perspective view of a switch box included in the information reproducing system of the embodiment.

First, an overall configuration of an information reproducing system of the present invention is explained with reference to FIGS. 1A to 1D. FIG. 1A is a front view of an information reproducing system 100. FIG. 1B is a perspective view of a DVD player 1. FIG. 1C is a perspective view of a remote controller 10. FIG. 1D is a perspective view of a switch box 20.

As shown in FIG. 1A, the information reproducing system 100 of the embodiment has the DVD player 1, the remote controller 10 and the switch box 20.

As shown in FIG. 1B, the DVD player 1 has: a body 2; a disk slot 3 for insertion and ejection of a DVD; a power switch 4; a display panel 5; an infrared receiving device 6; a keyboard 7; and a connector 8. A display device 80 is connected to the DVD player 1. The display device 80 displays images or pictures corresponding to a display signal. The display signal is sent from the DVD player 1 to the display device 80 in order to display a menu, reproducing information recorded on the DVD and other information by the display device 80.

Next, the DVD, which is reproduced by the DVD player 1, is explained.

The DVD is an optical disk having a much greater (about 7 times) memory capacity than a CD (Compact Disk) or the like. The DVD is based on the DVD standard, and is available to various purposes. The DVD makes it possible not only to record music information onto one disk but also to record images and pictures corresponding to fully one film or movie onto one disk. Furthermore, various kinds of information are arranged on the DVD in such a condition that the user can select a desired information by using a menu. For example, in case that a film is recorded onto the DVD, subtitles translated by 32 languages can be recorded onto the DVD together with the film. The user can select one language from among 32 languages by using a menu. Moreover, according to the DVD, the so called multi-angle reproduction can be realized. Namely, a plurality of films each having the same story but having a different camera angle are recorded on the DVD, and the user can select one camera angle by using menu. Thus, the user can enjoy the film with various camera angles.

Furthermore, a menu (i.e., program or data for displaying the menu) is also recorded on the DVD together with the film in order to allow the user to select the language of the subtitles, the camera angle, and so on.

Moreover, in case that plural types of pictures are recorded on the DVD, a menu is also recorded on the DVD together with the pictures in order to allow the user to select the pictures. The menu is displayed before the start of reproduction of the pictures.

Thus, the user can select a desired picture by seeing the menu.

The keyboard 7 of the DVD player 1 has switches necessary for allowing the user to select various types of reproductions as mentioned above. The display panel 5 is a liquid crystal display, and displays reproduction states and so on.

As shown in FIG. 1C, the remote controller 10 has: a body 19; a plurality of selection switches 11 to 14; an enter switch 15; a keyboard 16 for allowing the user to operate reproduction; an infrared emitting device 17; and a connector 18. In addition, a power switch is included in the keyboard 16.

As shown in FIG. 1D, the switch box 20 has: a body 26; a plurality of selection switches 21 to 24; an enter switch 25; a connecting wire 28; a connector 27 connected with one end of the connecting wire 28.

As shown in FIG. 1A, the DVD player 1, the display device 80 and the switch box 20 are mounted in the body 101. The display device 80 is mounted at a position that the visitor can easily see its screen. The switch box 20 is mounted at a position that the visitor can easily operate it. The DVD player 1 is mounted in the inside of the body 101. The visitor cannot see the DVD player 1 directly.

(II) Internal Constructions of Information Reproducing System

Next, an internal construction and an operation of each device of the information reproducing system 100 are explained.

First, an internal construction and an operation of the DVD player 1 is explained with reference to FIGS. 2A and 2B.

Figure 2A:
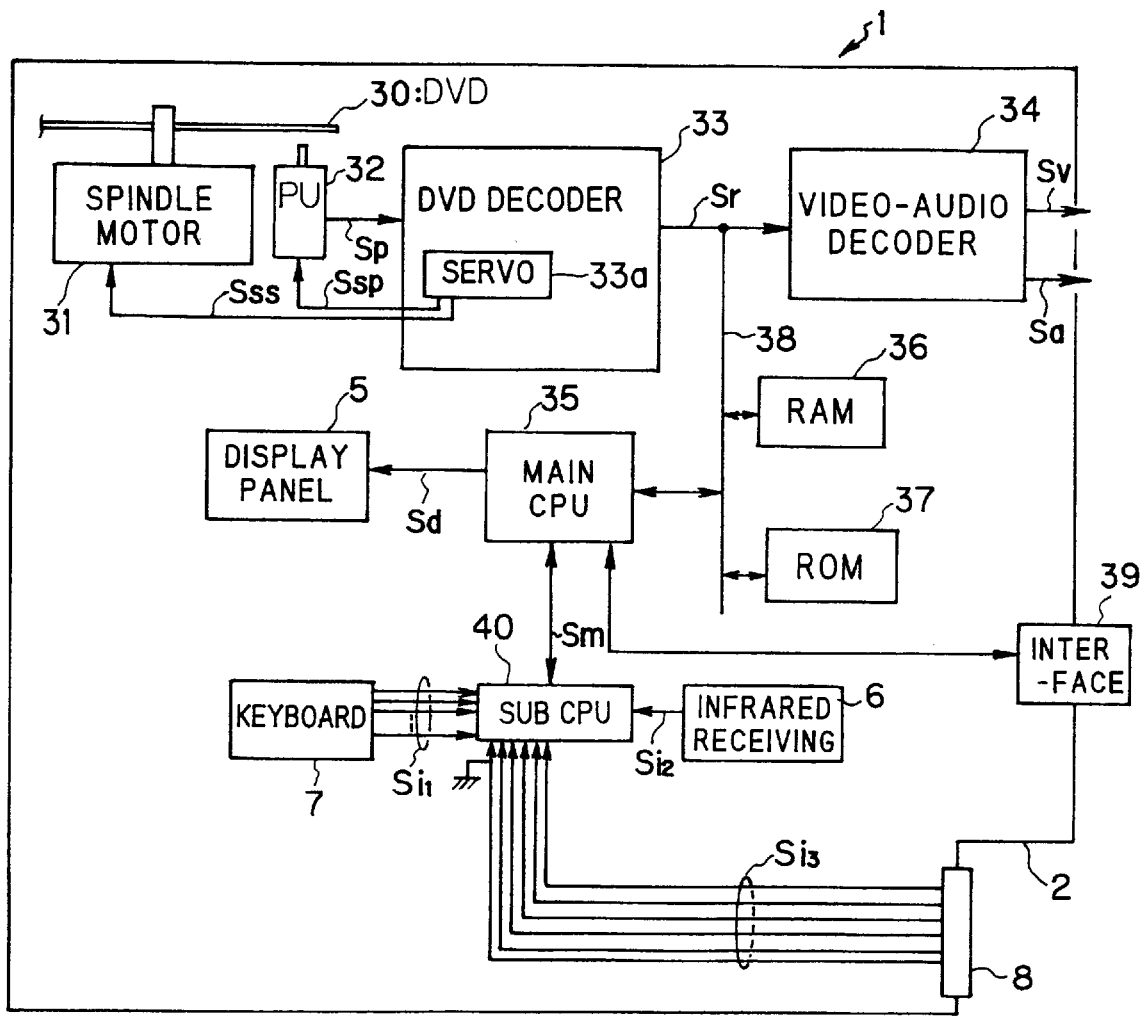
FIG. 2A is a block diagram showing a configuration of the DVD player of the embodiment.

As shown in FIG. 2A, the DVD player 1 has: a DVD 30; a spindle motor 31; a pickup 32; a DVD decoder 33; a video-audio decoder 34; a main CPU 35; a RAM (Random Access Memory) 36; a ROM (Read Only Memory) 37; a bus 38; an interface 39; a sub CPU 40; the display panel 5; the infrared receiving device 6; the keyboard 7; and the connector 8. These parts are installed in the body 2.

The spindle motor 31 rotates the DVD 30 at a constant liner velocity under the control of a spindle servo signal Sss supplied from a servo circuit 33a installed in the DVD decoder 33. Reproduction information to be reproduced, such as images, pictures and the like, is recorded on the DVD 30.

The pickup 32 emits a laser beam onto an information recording surface of the DVD 30, receives a reflective light of the laser beam, and outputs a detection signal Sp corresponding to the reproduction information. A tracking servo control and a focus servo control are performed by driving an actuator (not shown) installed in the pickup 32 under the control of a pickup servo signal Ssp supplied from the servo circuit 33a. In addition, the tracking servo control is a control to adjust an irradiation position of the laser beam in the radial direction of the DVD 30. The focus servo control is a control to adjust a focus of the laser beam.

The DVD decoder 33 demodulates the detecting signal Sp by using, for example, an 8–16 demodulation algorithm, and outputs a demodulation signal Sr. Furthermore, the DVD decoder 33 controls the servo circuit 33a so as to generate the spindle servo signal Sss and the pickup servo signal Ssp.

The video-audio decoder 34 decodes the demodulation signal Sr, and generates a video signal Sv and the sound signal Sa. The video signal Sv is applied to the display device 80. The sound signal Sa is applied to speakers (not shown).

The main CPU 35 controls the operations of the DVD decoder 33 and the video-audio decoder 34 via the bus 38.

A control programs necessary for the operations of the main CPU 35 are stored in the ROM 37. When necessary, the control programs are read out from the ROM 37, and supplied to the main CPU 35 via the bus 38.

The RAM 36 temporarily retains data to be used for the operations of the main CPU 35, and outputs the data when necessary.

The interface 39 is constructed by the RS-232C standard for example. Data output and data input can be performed between the main CPU 35 and other devices or other systems through the interface 39.

The infrared receiving device 6 receives infrared emitted from the infrared emitting device 17 of the remote controller 10, and extracts an instruction signal Si2 from the received infrared. The instruction signal Si2 is applied to the sub CPU 40.

When the user inputs an instruction to the keyboard 7, an instruction signal Si1 corresponding to the inputted instruction is applied to the sub CPU 40 from the keyboard 7. The user can operate the DVD player 1 by using the keyboard 7, for example, to turn on or off, to start or stop reproduction, to eject the DVD 30, and so on. In addition, the keyboard 7 is not for the visitors but for the user or the owner of the information reproducing system 100.

The connector 8 is detachably connected to the connector 27 of the switch box 20. An instruction signal Si3 is sent from the switch box 20 to the sub CPU 40 via connectors 8 and 27.

The sub CPU 40 generates a command signal Sm including a command code corresponding to the instruction signals Si1, Si2 or Si3, and outputs the command signal Sm to the main CPU 35. The lain CPU 35 controls the DVD player 1 on the basis of the command signal Sm.

Figure 2B:
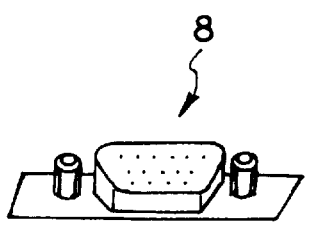
FIG. 2B is a perspective view of a connect or of the DVD player of the embodiment.

As shown in FIG. 2B, the connector 8 is a standard type 15 pins connector that is generally used as an external connector for computers and the like. In order to connect between the sub CPU, 40 and the switch box 20, at least 6 lines are needed. 5 lines are used for connection with the selection switches 21 to 24 and the enter switch 25, respectively. 1 line is used for a common line. Thus, 6 pins among the 15 pins of the connector 8 are used for the connection between the switch box 20 and the sub CPU 40.

The sub CPU 40 is an IC (Integrated Circuit) chip serving as a CPU or an MPU. In this IC chip, a plurality of universal terminals (free assign terminals or spare terminals) are preinstalled. Various functions can be assigned to the universal terminals by installing data and programs into an internal ROM of this IC chip. In the embodiment, a part of or all of the universal terminals are connected to the connector 8 in order to be connected with the selection switches 21 to 24 and the enter switch 25 via the connector 8 and 27. Thus, the universal terminals serve as input terminals for the selection switches 21 to 24 and the enter switch 25, respectively. Furthermore, another universal terminal is connected to the common line to be connected to the common line of the switch box 20. This universal terminal serves as a ground terminal. If any of the switches 21 to 25 is depressed, a potential difference between the universal terminal (ground terminal) connected with the common line and the universal terminal connected with the depressed switch is changed. Therefore, the sub CPU 40 can recognize the depressed switch. In this manner, the universal terminals serves as a single pole terminal, so that it is not necessary to wire two lines for each switch. As shown in FIG. 1D, there are only 5 switches on the switch box 20, so that the IC chip having a small number of universal terminals can be used as the sub CPU 40.

The display panel 5 displays conditions or operations of the DVD player 1 on the basis of a display signal Sd supplied from the main CPU 35.

Next, an internal construction and an operation of the remote controller 10 are explained with reference to FIGS. 3A and 3B.

Figure 3A:
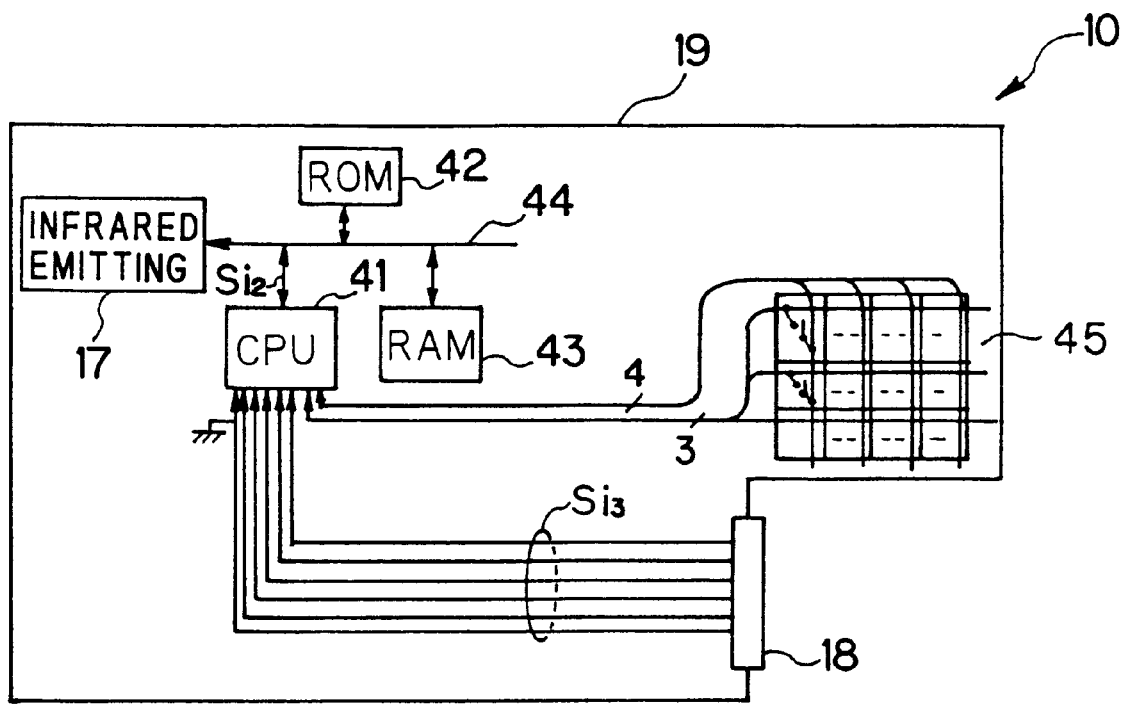
FIG. 3A is a diagram showing a configuration of the remote controller of the embodiment.

As shown in FIG. 3A, the remote controller 10 has: a CPU 41, a ROM 42, a RAM 43, a bus 44, a connector 18, a key matrix circuit 45 where switch elements corresponding to the respective selection switches 11 to 14, the enter switch 15 and the keyboard 16 are arranged. These devices are installed in the body 19 together with the infrared emitting device 17. In addition, the ROM 42 and the RAM 43 may be installed the inside of the CPU 41.

If the user or the visitor depresses any of the selection switches 11 to 14, the enter switch 15 and the keyboard 16, the corresponding switch elements becomes an ON, and then, the corresponding signal is applied to the CPU 41.

Figure 3B:
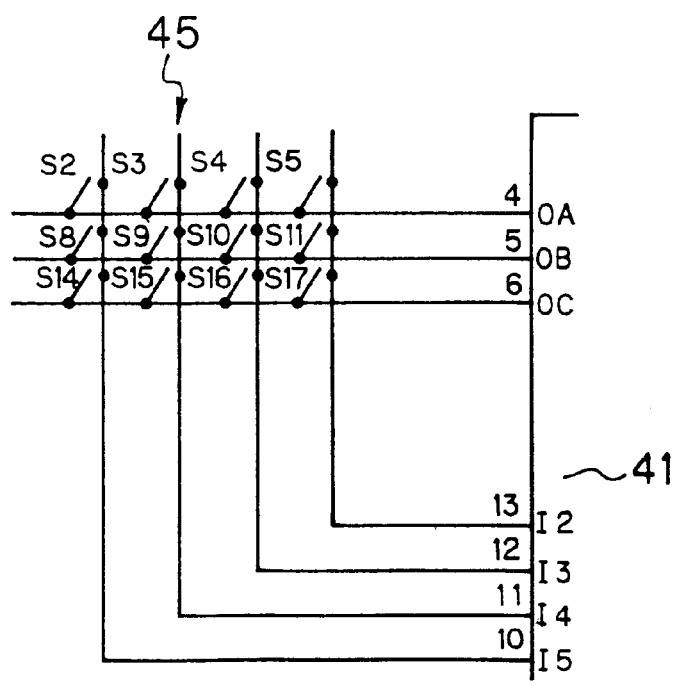
FIG. 3B is a diagram showing a key matrix circuit installed in the remote controller of the embodiment.

As shown in FIG. 3B, the switch elements corresponding to the switches 11 to 16 are arranged on the key matrix circuit 45 in a matrix. The CPU 41 sequentially applies a voltage to the key matrix circuit 45 from terminals OA, OB, and OC in this order. For example, when the CPU 41 applies the voltage from a terminal OA, the CPU 41 sequentially detects the voltage of the terminal I2 to 15. If the CPU 41 obtains the voltage of the terminal 12, the CPU 41 determines that the switch element S5 is an ON. This manner is called a key scan method. Thus, the CPU 41 determines whether or not each switch element is an ON, and recognizes a switching condition.

Furthermore, the CPU 41 outputs an instruction signal Si2 corresponding to the recognized switching condition to the infrared emitting device 17 via the bus 44. The infrared emitting device 17 converts the instruction signal Si2 into an infrared instruction signal.

Moreover, the CPU 41 is also connected to the connector 18. The connector 18 is the same as the connector 8 of the DVD player 1. Therefore, the connector 27 of the switch box 20 can be detachably connected to the connector 18. If the connector 27 of the switch box 20 is connected to the connector 18, the instruction signal Si3 is supplied to the CPU 41 via the connectors 18 and 27. Then, the CPU 41 outputs the instruction signal Si2 corresponding to the instruction signal Si3 to the infrared emitting device 17. Then, the infrared emitting device 17 converts the instruction signal Si2 into an infrared instruction signal.

The connection between the CPU 41 and the connector 18 is the same manner as the connection between the sub CPU 40 and the connector 8. Namely, the IC chip, which may be the same IC chip used as the sub CPU 40, and in which a plurality of universal terminals are pre-installed, is used as the CPU 41, and a part of or all of the universal terminals are connected to the connector 18.

In the ROM 42, control programs necessary for operations of the CPU 41 is stored. The control programs are supplied to the CPU 41 via the bus 44, when necessary.

The RAM 43 temporarily retains data necessary for the operations of the CPU 41, and outputs the data to the CPU 41 via the bus 44, when necessary. In addition, in the remote controller 10, assignments of the switch elements of the key matrix circuit 45 can be changed. Namely, each of the selection switches 11 to 14, the enter switch 15 and the switches included in the keyboard 16 can be variously assigned to any one of the switch elements arranged on the key matrix circuit 45. The assignments of the switch elements of the key matrix circuit 45 and formats of the instruction signal Si2 are stored in the RAM 43.

Next, an internal construction and an operation of the switch box 20 are explained with reference to FIG. 4.

Figure 4:
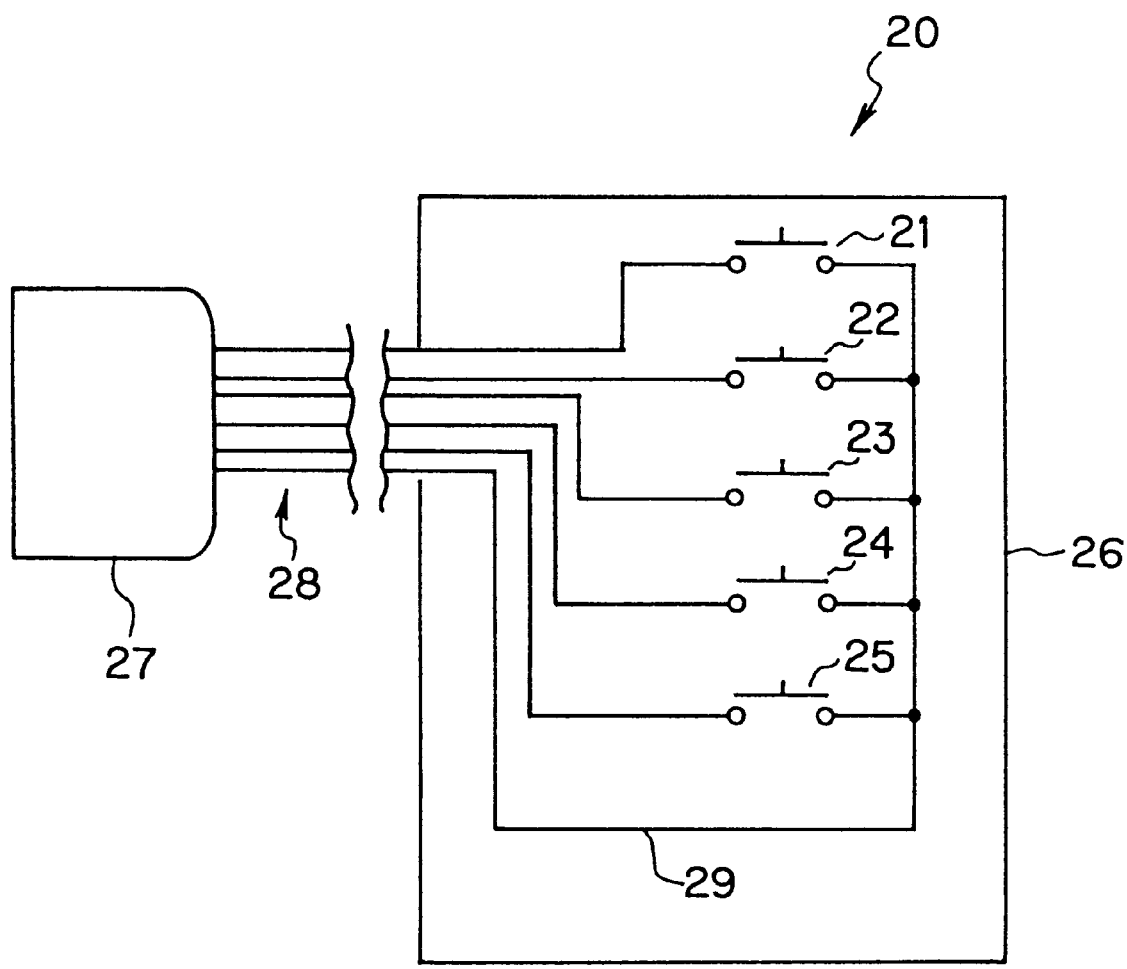
FIG. 4 is a diagram showing a configuration of the switch box of the embodiment.

As shown in FIG. 4, the switch box 20 has: the selection switches 21 to 24; the enter switch 25; the common line 29. These are installed in the body 26, and are connected with the connector 27 via the connecting wire 28.

One terminal of each of the switches 21 to 25 is connected to the common line 29. The other terminal is connected to the connector 27. When the switch box 20 is directly connected to the DVD player 1 via the connectors 27 and 8, the instruction signal Si3 is directly applied to the sub CPU 40. When the switch box 20 is connected to the remote controller 10, the instruction signal Si3 is applied to the sub CPU 40 via the CPU 41 of the remote controller 10, the infrared emitting device 17 of the remote controller 10, and the infrared receiving device 6 of the DVD player 1.

In addition, in the DVD player 1, the line connected the sub CPU 40 with the common line 29 via the connectors 8 and 27 is connected to a ground or a reference voltage of a circuit on which the sub CPU 40 is mounted.

Similarly, in the remote controller 10, the line connected the CPU 41 to the common line 29 via the connectors 18 and 27 is connected to a ground or a reference voltage of a circuit on which the CPU 41 is mounted.

(III) Information Reproduction

Next, information reproduction of the information reproducing system 100 is explained with reference to FIGS. 5 and 6. In the description set forth herein, it will be assumed that the switch box 20 is directly connected with the DVD player 1 via the connectors 8 and 27 so as to allow the visitor to operate the switches of the switch box 20 and control reproduction of the reproduction information recorded on the DVD 30.

Figure 5:
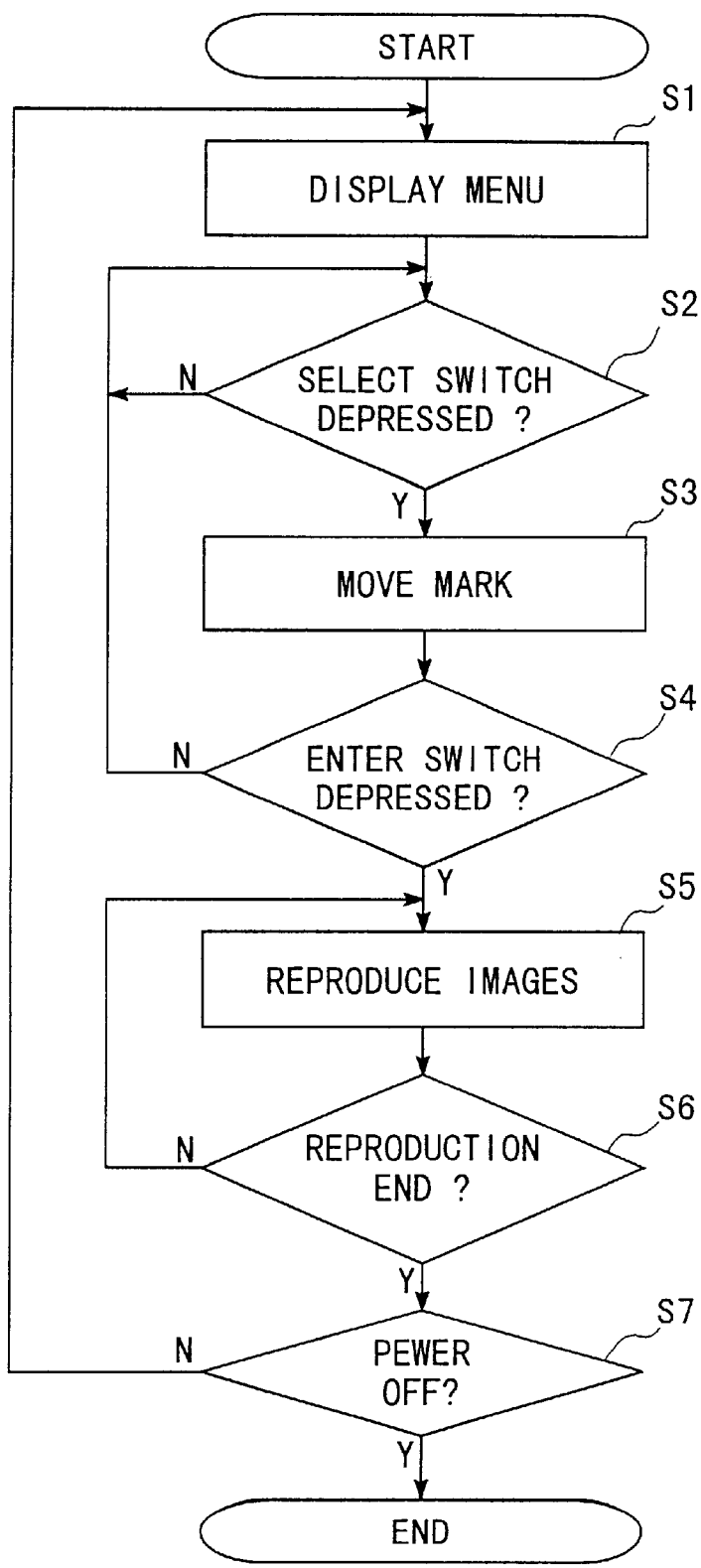
FIG. 5 is a flowchart showing a reproduction operation of the information reproducing system of the embodiment.

As shown in FIG. 5, first, a menu with respect to a plurality of display items is displayed on the display device 80 under the control of the main CPU 35 of the DVD player 1 (Step 1).

Figure 6:
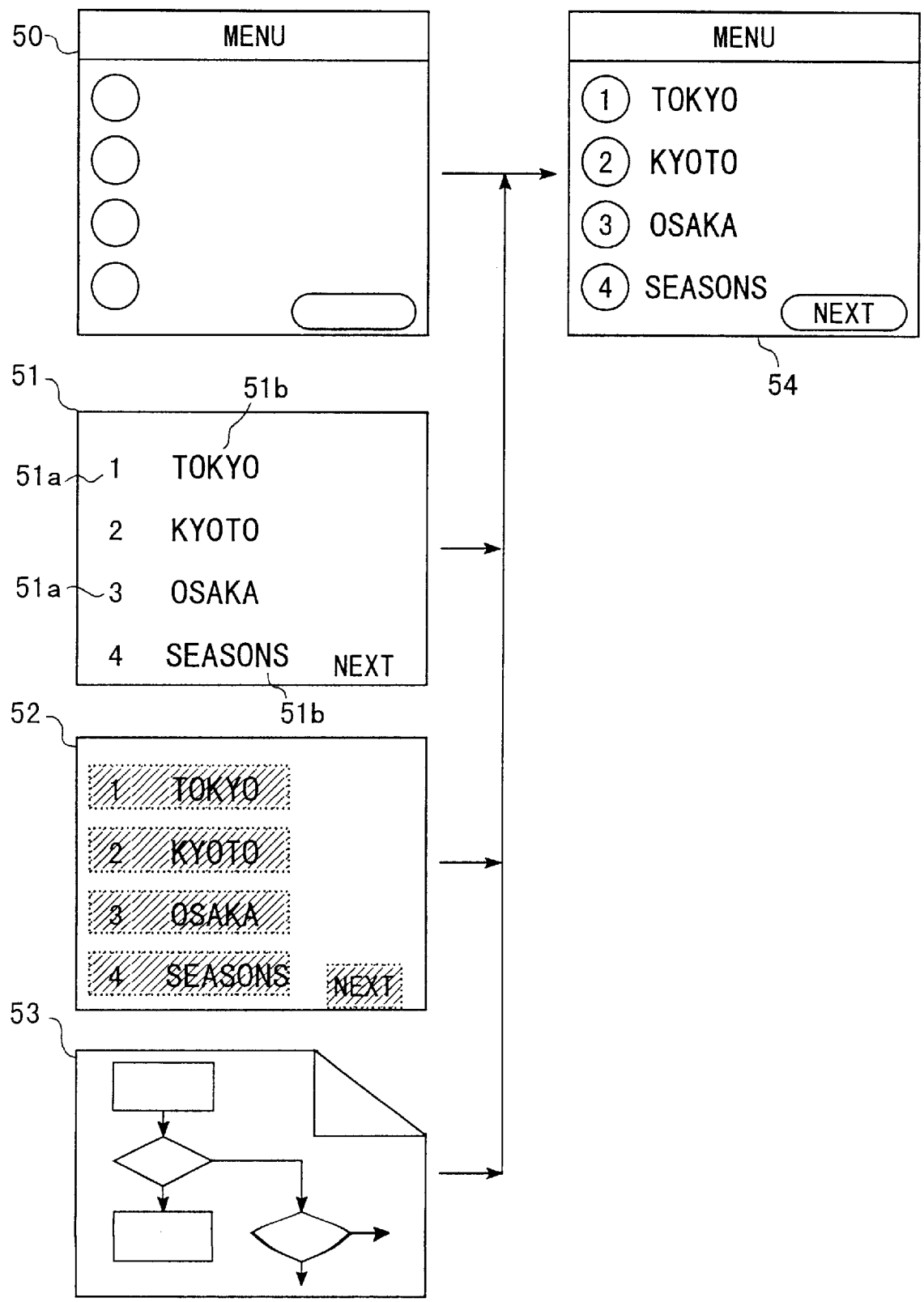
FIG. 6 is a diagram showing a menu displayed on a display apparatus of the embodiment.

For example, at the step 1, the menu 54 shown in FIG. 6 is displayed. In the embodiment, the information reproducing system 100 is used for display of sightseeing information with respect to Japanese famous places. A plurality of images with respect to Japanese famous places are recorded on the DVD 30 as information units. As shown in FIG. 6, the selection numbers 51a and the titles 51b of 4 display items with respect to Japanese famous places are listed in the menu 54. The visitor can select any display item from among the 4 or more display items displayed in the menu 54. Then, the images (information units) corresponding to the selected display item (reproduction item) are reproduced, as described later.

As shown in FIG. 6, in order to display the menu 54, a back ground image 50, a sub picture information 51, a high light information 52 are recorded on the DVD 30 as menu information. Furthermore, a high light command information 53 are recorded on the DVD 30 as reproduction control command information.

The back ground image 50 is a back ground image of the menu 54. The back ground image 50 is compressed by an MPEG2 (Moving Picture Expert Group 2) method, and recorded on the DVD 30. The back ground image 50 is a static image. Alternatively, animations or dynamic images may be used as the back ground image 50. Furthermore, a colorful image may be used as the back ground image 50. Moreover, various types of images may be used for the back ground image 50. In this case, a plurality of images are recorded in advance on the DVD 30, and the main CPU 35 selects any one of the images.

The sub picture information 51 includes characters, numerals, or letters used for displaying selection numbers 51a and titles 51b of the display items in the menu 54. Semitransparent or colorful characters may be used in the sub picture information 51. Moreover, various different colors are used for each character.

Next, the high light information 52 is information to put high light marks in the menu 54. For example, when the visitor selects any one of the selection numbers 51a or the title 51b, the main CPU 35 changes color or brightness of the selected number 51a and the corresponding title 51b by using the high light information 52 in order to allow the visitor to confirm the selected number 51a and the corresponding title 51b, i.e., the selected display item. More concretely, the main CPU 35 changes color or brightness of the selected number 51a and the corresponding title 51b as follows: information with respect to a high light mark having different color from the selection numbers 51a and the titles 51b is included in the high light information 52, and the high light mark is superimposed on the selected number 51a and the corresponding title 51b on the basis of the high light information 52. Alternatively, the main CPU 35 may change color or brightness of the selected number 51a and the corresponding title 51b as follows: information of the same characters as the selection numbers 51a and the titles 51b, but having different color from the selection numbers 51a and the titles 51b is included in the high light information 52, and the selected number 51a and the corresponding title 51b are replaced with tile different color characters included in the high light information 52.

The high light command information 53 includes instructions or commands for controlling operations of the DVD player 1. The instructions or the commands correspond to each display item. When the visitor selects any display item from among display items displayed in the menu 54, the instructions or the commands corresponding to the selected display item are read from the DVD 30, and the DVD player 1 is controlled by the read instructions or commands. For example, the high light command information 53 includes addresses of images corresponding to each display item, and information for deciding a reproduction order of images corresponding to each display item. More concretely, the high light command information 53 is written by a computer language or the like.

At the step 1, the main CPU 35 reads the back ground image 50, the sub picture information 51, and the high light information 52 from the DVD 30, combines them each other, and form the menu 54. Then, the menu 54 is displayed on the display device 80. The visitor sees the menu 54, and operates the switches of the switch box 20 in order to select any one of display item from among the display items.

Next, the sub CPU 40 determines on the basis of the instruction signal Si3 whether or not any switch of the switch box 20 is depressed (Step 2). If there is no depressed switch (Step 2; NO), the sub CPU 40 waits until any switch is depressed. On the other hand, if any switch is depressed (Step 2; YES), the sub CPU 40 outputs the command signal Sm corresponding to the instruction signal Si3 to the main CPU 35. Then, the main CPU 35 controls the DVD player 1 by using the high light information 52 so as to move the high light mark (Step 3). Thus, the high light mark moves depending on the depression of the selection switches 21 to 24 of the switch box 20.

More concretely, in FIG. 1D, when the switch 21 is depressed, the high light mark moves in the upward direction, i.e., the selection number 51a designated by the high light mark shifts as follows: 4.→3.→2.→1. When the switch 23 is depressed, the high light mark moves in the downward direction, i.e., the selection number 51a designated by the high light mark shifts as follows: 1.→2.→3.→4. In case that the selection numbers 51a and the titles 51b are arranged in 2 columns in horizontally, when the switch 22 or 24 is depressed, the high light mark moves in the right or left direction. Moreover, when the high light mark is located on any selection number 51a and the corresponding title 51b arranged in the right column, and then, the switch 22 is depressed, the high light mark shifts onto a "NEXT" switch icon, as shown in FIG. 6.

Next, the sub CPU 40 determines on the basis of the instruction signal Si3 whether or not the enter switch 25 is depressed (Step 4). If the enter switch 25 is not depressed (Step 4; NO), the operation goes back to the step 2. On the other hand, when the visitor selects and decides one display item, the visitor depresses the enter switch 25. At this time, the sub CPU 40 determines that the enter switch 25 is depressed (Step 4; YES), and the sub CPU 40 outputs the command signal Sm corresponding to the instruction signal Si3 to tile main CPU 35. Then, the main CPU 35 reads the high light command information 53 corresponding to the selected display item from the DVD 30. Next, the main CPU 35 controls the DVD player 1 to fetch images corresponding to the selected display item from the DVD 30 in accordance with the instructions or the commands included in the high light command information 53, and displays the read images onto the display device 80 (Step 5). This means that the main CPU 35 controls the DVD player 1 by using the high light command information 53 corresponding to the selected display item, and reproduces the information units (images) corresponding to the selected display item.

Next, the main CPU 35 determines whether or not the reproduction of the images corresponding to the selected display item ends (Step 6). If the reproduction does not end (Step 6; NO), the operation goes back to the step 5, the reproduction is continued. On the other hand, if the reproduction ends (Step 6; YES), the main CPU 35 next determines whether or not the power switch 4 is switched over into an OFF by the user (Step 7). If the power switch 4 is not switched over into the OFF, the operation goes back to the step 1. On the other hand, if the power switch 4 is switched over into the OFF (Step 7; YES), the operation ends.

As described above, according to the information reproduction system 100, the high light command information 53 is recorded on the DVD 30, and the main CPU 35 reads the high light command information 53 from the DVD 30 when the switch box 20 is operated. Then, the main CPU 35 controls the DVD player 1 and displays the images corresponding to the selected display item in accordance with the high light command information 53. Namely, since the high light command information 53 is recorded on the DVD 30, it is possible to realize reproduction for display of information by using only the DVD player 1, the switch box 20, the display device 80 and DVD 30. Accordingly, it is possible to simplify the construction of the information reproducing system 100.

Furthermore, since the high light command information 53 is recorded on the DVD 30, it is possible to change contents of display by only exchanging the DVD 30.

Moreover, the switch box 20 and the DVD player 1 are detachably connected with each other by the connector 27 and 8.

Therefore, it is possible to make the connection between the switch box 20 and the DVD player 1 simpler.

Moreover, the selection numbers 51a and the titles 51b corresponding to display items are displayed in the menu 54, and the selection switches 21 to 24 to be used for selecting the selection numbers 51a and the titles 51b and the enter switch 25 to be used for deciding the selected number 51a and the corresponding title 51b are arranged on the switch box 20. Therefore, the visitor can easily select the display item.

Moreover, the IC chip in which the universal terminals are pre-installed is used as the sub CPU 40, and the pre-installed universal terminals are used for the input terminals to receive the instruction signal Si3 from the switch box 20. Therefore, it is unnecessary to add the new input terminal to receive the instruction signal Si3. Accordingly, it is possible to simplify the construction of the DVD player 1.

Next, information reproduction of the information reproducing system 100 in case that the remote controller 10 is used is explained.

Like the switch box 20, the visitor or the user can select any display item displayed in the menu 54 by using the selection switches 11 to 14 arranged on the remote controller 10, and decide the selected item by using the enter switch 15 arranged on the remote controller 10. The instruction signal outputted from the selection switches 11 to 14 and the enter switch 15 are supplied to the CPU 41 via the key matrix circuit 45, and recognized by the CPU 41. Then, the instruction signal is transmitted to the DVD player 1 from the infrared emitting device 17 as the instruction signal Si2, and the DVD player 1 reads the high light command information 53 from the DVD 30 in accordance with the instruction signal Si2, and performs the reproduction on the basis of the high light command information 53.

Also, in case that the reproduction is performed by using the remote controller 10, since the high light command information 53 is recorded on the DVD 30, it is possible to reproduce the reproducing information by using only the DVD player 1, the remote controller 10, the display device 80, and the DVD 30.

Further more, the remote controller 10 is connected with the DVD player 1 by infrared. Therefore, it is possible to place the remote controller 10 at various places. Accordingly, it is possible to improve usability of the information reproducing system 100.

Moreover, the selection numbers 51a and the titles 51b corresponding to display items are displayed in the menu 54, and the selection switches 11 to 14 to be used for selecting the selection numbers 51a and the titles 51b and the enter switch 15 to be used for deciding the selected number 51a and the corresponding title 51b are arranged on the remote controller 10. Therefore, the visitor or the user can easily select the display item.

Moreover, the information reproducing system 100 has both the switch box 20 and the remote controller 10 in order to send the instruction signal to the DVD player 1. Therefore, the user can select either of the switch box 20 and the remote controller 10 according to circumstances.

Moreover, if the connector 18 of the remote controller 10 is detachably connected to the connector 27 of the switch box 20, the instruction signal Si3 can be send from the switch box 20 to the DVD player 1 via the remote controller 10. In this case, the user or the visitor can use both the switch box 20 and the remote controller 10 in order to control the DVD player 1. Therefore, it is possible to improve usability of the information reproducing system 100.

Furthermore, the IC chip in which the universal terminals are pre-installed is used as the CPU 41 of the remote controller 10, and the pre-installed universal terminals are used for the input terminals to receive the instruction signal from the switch box 20. Therefore, it is unnecessary to add the new input terminal to receive the instruction signal Si3. Accordingly, it is possible to simplify the construction of the remote controller 10.

Figure 7:
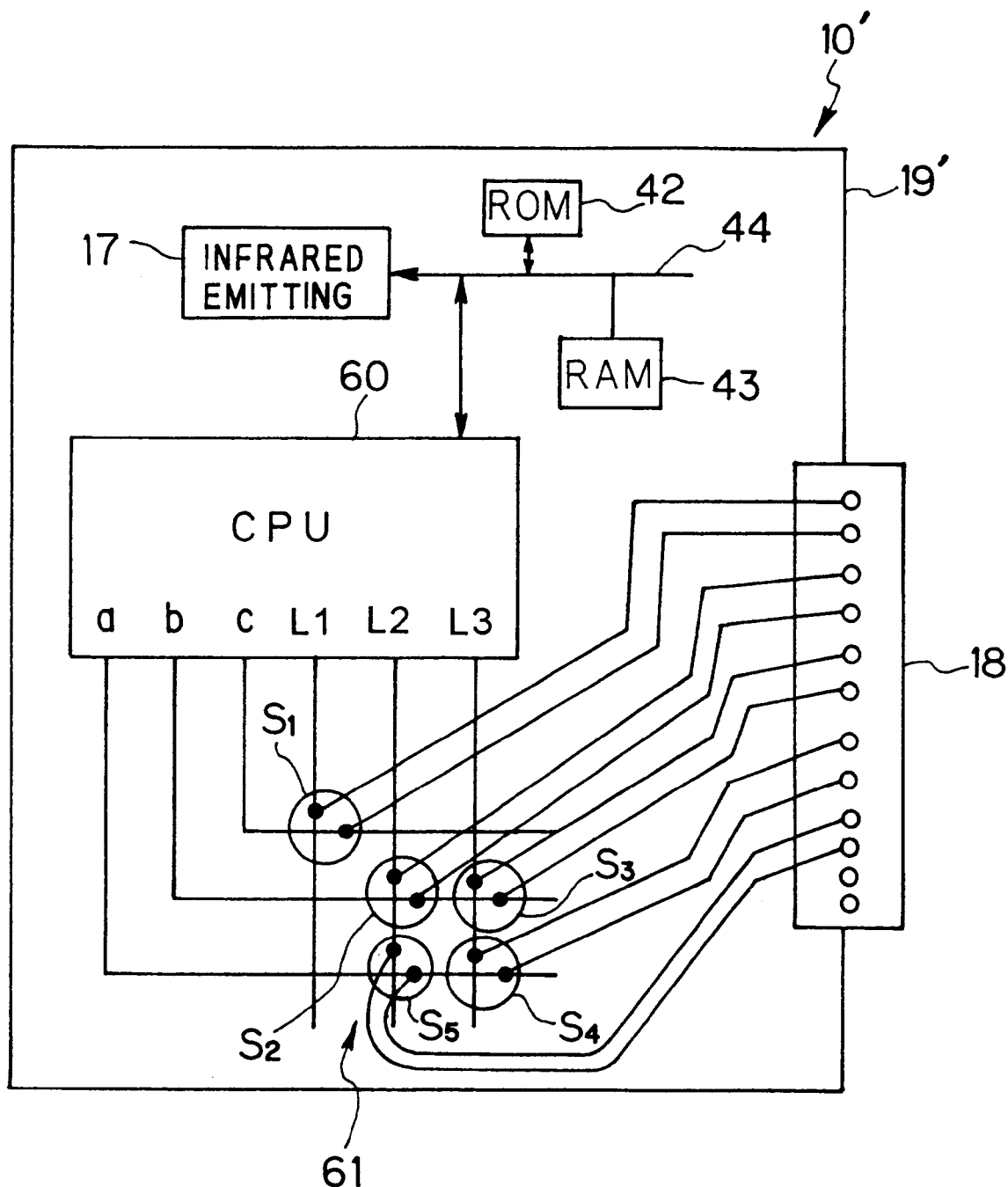
FIG. 7 is a diagram showing a modification of the remote controller of the embodiment.
Figure 8A:
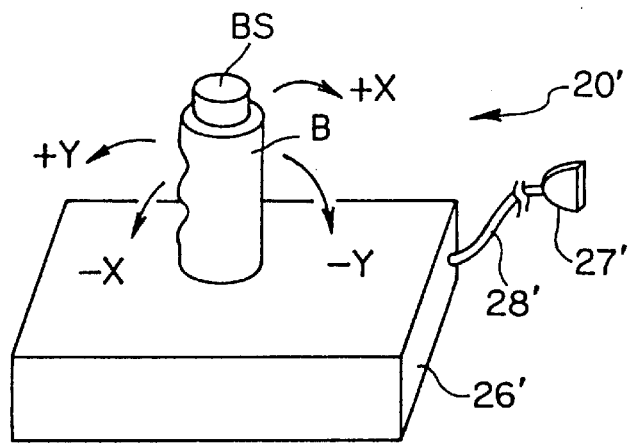
FIG. 8A is a perspective view of a joystick controller of the embodiment.
Figure 8B:
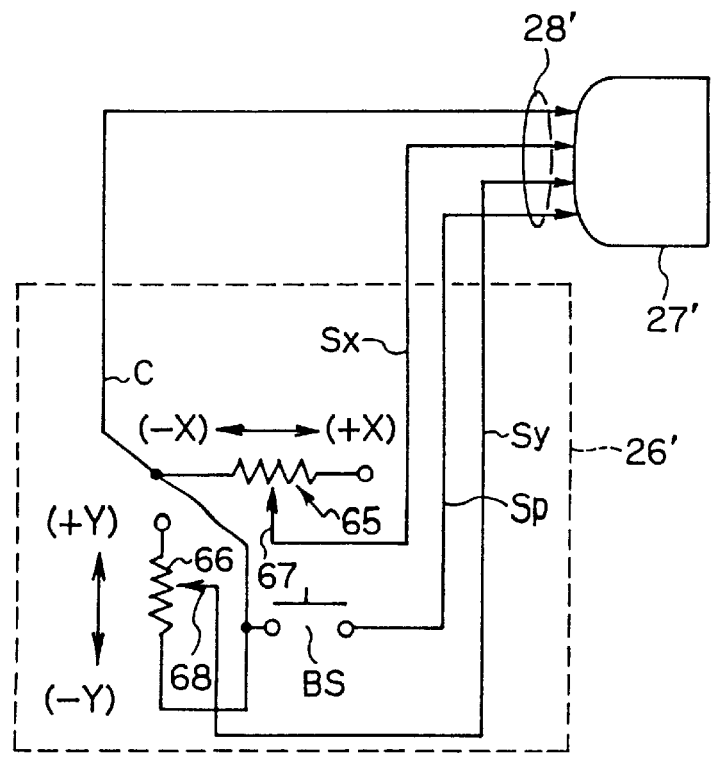
FIG. 8B is a diagram showing a configuration of the joystick controller of the embodiment.

(IV) Modifications of Remote Controller and Switch Box Next, modifications of the remote controller and the switch box are explained with reference to FIGS. 7, 8A and 8B. FIG. 7 shows a modification of the remote controller. FIGS. 8A and 8B show a joystick controller as a modification of the switch box 20. In FIG. 7, the same constructional elements as those in FIG. 3A carry the same reference numbers and explanations thereof are omitted.

First, a modification of the remote controller 10 is explained with reference to FIG. 7.

In the remote controller 10 shown in FIG. 3A, the switches 11 to 15 are connected to the CPU 41 via the key matrix circuit 45, and the terminals of the connector 18 are connected to the universal terminals of the CPU 14. However, in a modification 10' of the remote controller 10, as shown in FIG. 7, the terminals of the connector 18 are connected to the switch elements SI to S5 of the key matrix circuit 61, respectively. In addition, the connecting arrangement of terminals of the connector 18 corresponds to that of the connector 8.

Thus, the connector 18 can share the key matrix circuit 61 with the switches 11 to 15. Therefore, the universal terminals of the CPU 41 are unnecessary. Consequently, it is possible to simplify the construction of the remote controller 10'.

Next, a joystick controller is explained with reference to FIGS. 8A and 8B.

As shown in FIG. 8A, a joystick controller 20' has: a body 26'; a joystick B serving as the selection switches 21 to 24 of the switch box 20; an enter switch BS serving as the enter switch 25 of the switch box 20; a connection wire 28'; and a connector 27' which is the same type as the connector 27 of the switch box 20.

Next, an internal construction of the joystick controller 20' is explained with reference to FIG. 8B. The joystick controller 20' has a resistors 65, a resister 66 and the enter switch BS. One end of each of the resistors 65 and 66 is open, and the other end is connected to one of the terminals of the connector 27' via a common line C. The enter switch BS is connected between the common line C and another one of the terminals of the connector 27'.

Furthermore, movable terminals 67 and 68 are associated with the resistors 65 and 66, respectively, and the movable terminals 67 and 68 are independently connected to the other terminals of the connector 27'. When the joystick B is tilted in the +X or −X direction, the movable terminal 67 slides on the resistor 65 depending on a tilt angle of the joystick B. When the joystick B is tilted in the +Y or −Y direction, the movable terminal 68 slides on the resistor 66 depending on a tilt angle of the joystick B.

In addition, the joystick B automatically returns to the vertical position, when the joystick B is released.

The resistor 65 and the movable terminal 67 function as the selection switches 22 and 24 of the switch box 20. When the movable terminal 67 slides in the +X direction, the same instruction signal Sx as the instruction signal outputted by depression of the switch 22 is outputted. When the movable terminal 67 slides in the −X direction, the same instruction signal Sx as the instruction signal outputted by depression of the switch 24 is outputted.

Furthermore, the resistor 66 and the movable terminal 68 function as the selection switches 21 and 23 of the switch box 20. When the movable terminal 68 slides in the +Y direction, the same instruction signal Sy as the instruction signal outputted by depression of the switch 21 is outputted. When the movable terminal 68 slides in the −Y direction, the same instruction signal Sy as the instruction signal outputted by depression of the switch 23 is outputted.

The common line C connected with the one end of each of the resistors 65 and 66 is connected with a ground or a reference voltage of the remote controller 10 or the DVD player 1.

Moreover, when the enter switch BS is depressed, the same instruction signal Sp as the instruction signal outputted by depression of the enter switch 25 of the switch box 20 is outputted to the connector 27.

Each of the instruction signal Sx and Sy is resistance value which changes with the tilt angle of the joystick B. In case that the joystick controller 20' is connected to the connector 18 of the remote controller 10 or the connector 8 of the DVD player 1, each universal terminal of the CPU 41 or sub CPU 40 must serve as an analog input terminal which can detect an analog value. In this case, a pull-up resistor may be connected to each universal terminal, and a certain voltage is applied to each universal terminal. Furthermore, the control program for detecting the analog value is installed in the CPU 41 or the sub CPU 40. In this case, the CPU 41 or the sub CPU 40 determines whether or not the detected voltage or resistor value of each universal terminal is within the predetermined range.

Moreover, in case that the joystick controller 20' is directly connected to the universal terminals of the CPU 41 or the sub CPU 41, it is possible to control quickly the DVD player 1, because neither a key scan method generally used for switching control nor a parallel to serial conversion generally used for an infrared emitting device is need.

In addition, in case that the remote controller 10 and the switch box 20 are connected with each other, the power may be supplied from the switch box 20 to the remote controller 10 via the connectors 18 and 27.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An information reproducing system for selecting a reproduction item from a plurality of reproduction items, fetching at least one information unit corresponding to the selected reproduction item from a plurality of information units, and reproducing the fetched information unit, the information reproducing system comprising:
   a recording medium on which are recorded the plurality of information units with respect to the plurality of reproduction items, reproduction control command information for fetching at least one information unit corresponding to a selected reproduction item, and menu information for forming a menu such that the menu has a plurality of reproduction items arranged respectively;
   a displaying apparatus connected to a reproducing apparatus for displaying the menu;
   a selecting apparatus for outputting a plurality of instruction signals to the reproducing apparatus for selecting a reproduction item from the menu, wherein the selecting apparatus has a plurality of switches that respectfully correspond to the plurality of instruction signals such that when any one of the plurality of switches is operated, the selecting apparatus outputs the instruction signal corresponding to the operated switch;
   a reproducing apparatus comprising:
      a menu displaying device for reading the menu information from the recording medium, forming the menu by using the read menu information, and displaying the formed menu onto the displaying apparatus;
      a receiving device for receiving an instruction signal from the plurality of instruction signals, wherein the receiving device has a controller having a plurality of universal terminals connected to the plurality of switches of the selecting apparatus through a single line for receiving a respective instruction signal from the plurality of instruction signals;
      a control device for reading the reproduction control command information from the recording medium and fetching at least one information unit from the plurality of information units recorded on the recording medium on the basis of the read reproduction control command information and the received plurality of instruction signals; and
      a reproducing device for reproducing the fetched information unit;
   a first casing for disposing the selecting apparatus;
   a second casing for disposing the reproducing apparatus, wherein the second casing is separated from the first casing; and
   a wire connecting the selecting apparatus to the reproducing apparatus.

2. The information reproducing system according to claim 1, wherein the reproducing apparatus further comprises a first connector, one end of the wire is connected to a second connector, and the first connector and the second connector are detachably connected to each other.

3. The information reproducing system according to claim 1, wherein the reproducing apparatus further comprises a mark displaying device for displaying a mark indicating the selected reproduction item from the plurality of reproduction items in the menu on the basis of the received instruction signals.

4. The information reproducing system according to claim 3, wherein the plurality of switches of the selecting apparatus includes an arrow switch for moving the displayed mark and an enter switch for determining a reproduction item from the plurality of reproduction items indicated by the displayed mark.

5. The information reproduction system according to claim 1, wherein the selecting apparatus comprises a joystick for selecting a reproduction item from the plurality of reproduction items.

6. The information reproduction system according to claim 5, wherein the selecting apparatus outputs an instruction signal from the plurality of instruction signals when the joystick is tilted.

7. The information reproducing system according to claim 2 further comprising:
   a wireless control apparatus for receiving the plurality of instruction signals from the selecting apparatus and outputting each of the received instruction signals to the reproducing apparatus as a wireless control signal, the wireless control apparatus having a second controller having a plurality of universal terminals for receiving an instruction signal from the plurality of instruction signals, and a third connector for detachably connecting with the second connector of the wire;

a third casing for disposing the wireless control apparatus; and the reproducing apparatus having a second receiving device for receiving the wireless control signal from the wireless control apparatus.

8. An information reproducing system for selecting a reproduction item from a plurality of reproduction items, fetching at least one information unit corresponding to the selected reproduction item from a recording medium on which are recorded the plurality of information units with respect to the plurality of reproduction items, reproduction control command information for fetching at least one information unit corresponding to a selected reproduction item, and menu information for forming a menu such that the menu has a plurality of reproduction items arranged respectively, and reproducing the fetched information unit, the information reproducing system comprising:

a displaying apparatus connected to a reproducing apparatus for displaying the menu;

a selecting apparatus for outputting a plurality of instruction signals to the reproducing apparatus for selecting a reproduction item from the menu, wherein the selecting apparatus has a plurality of switches that respectfully correspond to the plurality of instruction signals such that when any one of the plurality of switches is operated, the selecting apparatus outputs the instruction signal corresponding to the operated switch;

a reproducing apparatus comprising:

a menu displaying device for reading the menu information from the recording medium, forming the menu by using the read menu information, and displaying the formed menu onto the displaying apparatus;

a receiving device for receiving an instruction signal from the plurality of instruction signals, wherein the receiving device has a controller having a plurality of universal terminals connected to the plurality of switches of the selecting apparatus through a single line for receiving a respective instruction signal from the plurality of instruction signals;

a control device for reading the reproduction control command information from the recording medium and fetching at least one information unit from the plurality of information units recorded on the recording medium on the basis of the read reproduction control command information and the received plurality of instruction signals; and a reproducing device for reproducing the fetched information unit;

a first casing for disposing the selecting apparatus;

a second casing for disposing the reproducing apparatus, wherein the second casing is separated from the first casing; and a wire connecting the selecting apparatus to the reproducing apparatus.

* * * * *